Jan. 16, 1962  J. H. BERTIN ETAL  3,016,699
AERODYNAMICALLY ACTING JET DEFLECTING DEVICE
Filed Sept. 28, 1953
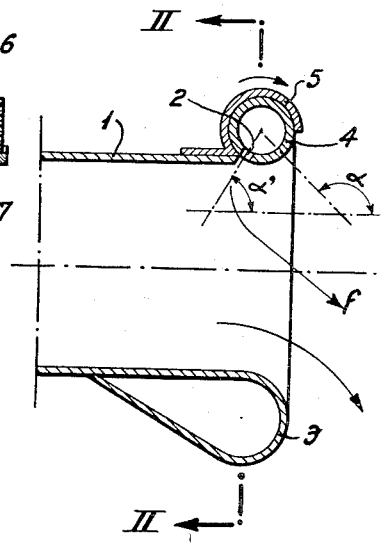
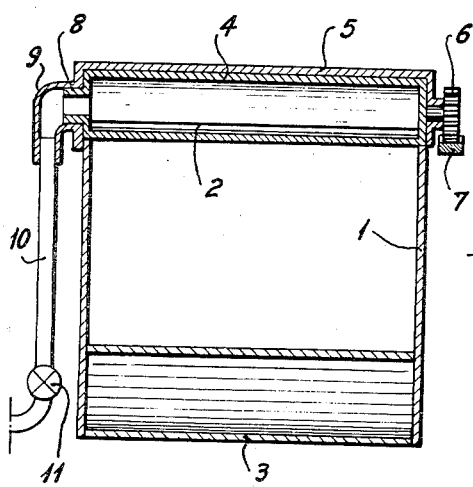
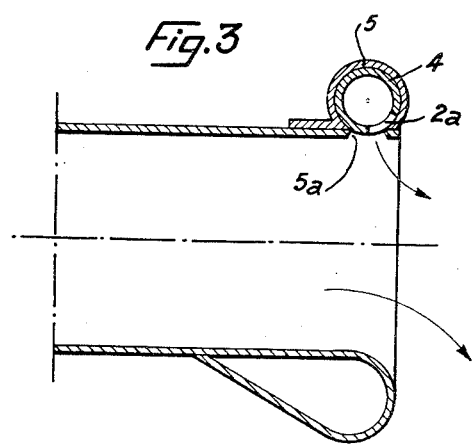
INVENTORS
Jean H. Bertin
Marcel Kadosch
Francois M. L. Maunoury
By Watson, Cole, Grindle &
Watson
ATTORNEYS United States Patent Office 3,016,699
Patented Jan. 16, 1962

3,016,699
AERODYNAMICALLY ACTING JET DEFLECTING DEVICE
Jean H. Bertin, Neuilly-sur-Seine, and Marcel Kadosch and François M. L. Maunoury, Paris, France, assignors to Societe Nationale d'Etude et de Construction de Moteurs d'Aviation, Paris, France, a French company
Filed Sept. 28, 1953, Ser. No. 382,894
Claims priority, application France Oct. 10, 1952
1 Claim. (Cl. 60—35.54)

The present invention relates to jet deflecting devices operating in an aerodynamic way, that is to say through the action of an auxiliary jet on the main stream to be deflected.

In such devices, an auxiliary jet—usually of compressed air—is formed at the nozzle outlet of a jet propulsion unit, at a substantial angle with the axis of the nozzle and even preferably in a direction inclined upstream with respect to the main flow. This auxiliary jet constitutes a sort of fluid obstacle causing a deflection of the main stream; this deflection is furthered and stabilized by laterally extending jet guiding means, e.g. a convex extension of the wall of the nozzle.

The deflection can be made unsymmetrical in order to produce a steering moment on the aircraft or it can be perfectly symmetrical when thrust spoiling or braking of the aircraft are desired.

The main object of the present invention is to provide an improved device of the above type which will allow gradual adjustment of the amount of deflection, i.e. the angular magnitude of the deflection.

Another object of this invention is to provide means for varying the injection angle of the auxiliary jet into the main stream to be deflected.

Still another object of this invention is to provide means for varying the injection area of the auxiliary jet thereby varying its mass flow and velocity.

These and other objects of the invention will be set forth in connection with the accompanying drawings in which:

FIGURE 1 is a diagrammatic longitudinal section of a jet propulsion nozzle equipped with a deflection device in accordance with the invention.

FIGURE 2 is a cross-section taken along line II—II of FIGURE 1.

FIGURE 3 is a view similar to that of FIGURE 1, showing a modification.

In the form of embodiment shown in FIG. 1, the discharge-nozzle 1, which is supposed to have a rectangular transverse cross-section (see FIG. 2), comprises along one of the large sides of the rectangle, an injection slot 2 for an auxiliary fluid, the static pressure of which is higher than the total pressure of the fluid in the said discharge-nozzle and which is, for example, taken from the delivery side of the air compressor in the case of a turbo-jet unit, or again, from the combustion chambers. On the opposite side of the rectangular orifice, there is formed a convex surface 3 which is tangentially joined to the interior surface of the discharge-nozzle and is progressively curved towards the exterior at an angle at least equal to the maximum deflection of the jet flowing out of the discharge-nozzle.

The slot 2 is mobile in the sense of rotation, so that the direction of the auxiliary fluid discharge from this slot can be caused to vary.

In the form of embodiment shown, the slot 2 is formed along the length of the generator of a cylinder 4 which may turn in a cylindrical housing 5 fixed to the discharge-nozzle. The rotation of the cylinder 4 is controlled, for example, by a pinion 6 fixed to the cylinder and actuated by a toothed rack 7 which, in turn, is operated by a suitable servo-motor. A hollow pivot 8 with which one end of the cylinder 4 is provided, serves to supply the latter with fluid under pressure, this pivot being engaged with a fluid-tight fitting in the head 9 of a tubular member 10. The latter is connected to the source of fluid under pressure, not shown, and is provided with a valve 11.

When this valve is closed, the jet flows out normally from the discharge-nozzle 1, spreading out about the axis of this latter, and the reaction thrust which it impresses on the moving object to which this discharge nozzle is fitted, is parallel to that said axis. When the valve 11 is opened, the auxiliary fluid issuing from the slot 2 in the direction of the arrow $f$ acts on the fluid flowing through the discharge-nozzle and pushes this fluid away from the wall adjacent to the slot 2. The fluid is thus deflected from its normal direction of flow and is caused to adhere to the tangential extension 3.

If, for the same amount of opening of the valve 11, the tube 4 is rotated, the direction of injection of the auxiliary fluid is varied and it will be noted that the degree of the deflection varies. This deflection, which is small for an obtuse angle $\alpha$ between the direction of injection and the axis of the discharge-nozzle, increases as the angle $\alpha$ is reduced and becomes a maximum for a value of the angle $\alpha'$ less than 90°.

For any given direction of the injection slot, the deflection increases with the power of the injection, that is to say with the degree of opening of the valve 11, and thus with the output of the injected fluid and/or the pressure of injection. With a slot or an injection nozzle which is fixed, for example at 90° with respect to the axis of the discharge-nozzle, the direction of the deflection may thus be varied progressively, if the valve is arranged so that the pressure and/or the output of the auxiliary fluid injected may thereby be modified.

FIG. 3 shows an embodiment of an injection nozzle which enables the output of the injected fluid to be varied between 0 (zero deflection) and a certain maximum (maximum deflection).

The rotating tube 4 supplied with auxiliary fluid, as in the form of embodiment of FIGS. 1 and 2, is provided with a wide slot 2a and the fixed tube 5 which surrounds it opens towards the interior of the discharge-nozzle through a slot 5a, the width of which is at least equal to that of the slot 2a. When the position of the tube 4 is such that the slot 2a is completely masked by the fixed tube 5, there is no fluid injected and the deflection of the jet flowing through the discharge-nozzle is zero. By causing the tube 4 to turn, the slot 2a is uncovered progressively to a greater or lesser extent that is to say that the output of injected fluid is variable, and this itself causes the amount of deviation of the fluid flowing through the discharge-nozzle to be varied, the maximum deflection being obtained when the slot 2a is fully uncovered.

In this embodiment, the valve 11 of FIGS. 1 and 2 may be dispensed with, the tube 4 being permanently connected to the source of fluid under pressure. If a valve 11 is provided as a measure of safety, this valve may operate only in its extreme positions, that is to say it will either be in its fully-open position or in its fully-closed position.

What we claim is:

The combination of a propulsion nozzle designed for producing a thrust providing stream of motive gas, and a device for deflecting said stream comprising an extension of the nozzle wall in the form of a cylindrical segment whose generatrices are perpendicular to the axis of said nozzle, said cylindrical segment facing toward the inside of said nozzle, a hollow cylindrical tubular member rotatably fitted into said cylindrical segment, a slot-like passage of constant area along a generatrix of said tubular member, means for supplying pressure gas to the inside of said tubular member whereby a gaseous jet is formed by said slot-like passage into said nozzle, and means for rotating said tubular member about said cylindrical segment whereby the angular position of said passage is varied.

References Cited in the file of this patent

UNITED STATES PATENTS

| | | |
|---|---|---|
| 1,524,266 | Longaker | Jan. 27, 1925 |
| 1,698,822 | Paxton | Jan. 15, 1929 |
| 2,472,839 | Kramer | Jan. 14, 1949 |
| 2,620,622 | Lundberg | Dec. 9, 1952 |
| 2,620,623 | Imbert | Dec. 9, 1952 |
| 2,630,673 | Woll | Mar. 10, 1953 |
| 2,637,164 | Robson et al. | May 5, 1953 |
| 2,651,172 | Kennedy | Sept. 8, 1953 |
| 2,654,552 | Jonas | Oct. 6, 1953 |
| 2,793,493 | Kadosch et al. | May 28, 1957 |

FOREIGN PATENTS

| | | |
|---|---|---|
| 503,064 | Belgium | May 31, 1951 |